United States Patent [19]

Combette et al.

[11] 4,182,218

[45] Jan. 8, 1980

[54] EXPANSION CORE ANCHOR

[75] Inventors: Marc Combette, Valence; Jean Luthringer, Paris, both of France

[73] Assignee: Societe de Prospection et d'Inventions Techniques, SPIT, Bourg-les-Valence, France

[21] Appl. No.: 841,784

[22] Filed: Oct. 13, 1977

[30] Foreign Application Priority Data

Jan. 28, 1977 [FR] France .................. 77 02515

[51] Int. Cl.² .................................... F16B 13/04
[52] U.S. Cl. ....................................... 85/84
[58] Field of Search ............. 85/84, 81, 83, 23, 85; 151/41.72, 41.73

[56] References Cited

U.S. PATENT DOCUMENTS

| 1,499,072 | 6/1924 | Pleister | 85/84 |
|---|---|---|---|
| 1,580,569 | 4/1926 | Pleister et al. | 85/84 |
| 2,404,928 | 7/1946 | Schutton | 85/23 |
| 2,601,803 | 7/1952 | Newman | 85/84 |
| 3,171,321 | 3/1965 | Fischer | 85/83 |
| 4,002,100 | 1/1977 | Bucheli | 85/85 |

FOREIGN PATENT DOCUMENTS 850510 9/1952 Fed. Rep. of Germany .
2287610 7/1974 France .

*Primary Examiner*—Rodney H. Bonck
*Attorney, Agent, or Firm*—William W. Jones; Paul J. Lerner

[57] ABSTRACT

An expansion core anchor comprising a cylindrical body having a head and a crural end, the head having an axial bore drilled into it wherein is lodged an expansion core, and at least one longitudinal slot formed in the crural end and defining therein two legs which are deformable upon driving-in of the expansion core. The slot is provided with at least a pair of internal projections, respectively adjacent two slot longitudinal edges situated on either side of the axial plane perpendicular to the slot median plane, for guiding the expansion core during driving thereof.

2 Claims, 5 Drawing Figures

EXPANSION CORE ANCHOR

The present invention relates to mechanical fasteners and, more particularly, to expansion core fasteners adapted to be anchored in a predrilled hole in a receiving material.

Fasteners of the type to which the present invention is directed comprise a cylindrical body formed with a head and a crural end which may be separated by a bearing means for the body to bear on the receiving material. The head, which is preferably provided with an external peripheral thread, is formed with an axial bore in which is lodged an expansion core, and at least one longitudinal slot formed in the crural end, providing therein two legs which are deformable upon driving of the expansion core.

Once the cylindrical body has been introduced into the hole previously drilled in the receiving material, and once the bearing means is positioned in abutment against the hole edge, the expansion core, which has a diameter greater than the width of the cylinder crural extremity slot, is struck, deforming the legs outwardly and thereby ensuring the anchoring of the fastener.

It sometimes happens that the core is not driven concentrically to the cylindrical body. This may occur because the legs of the body, instead of deviating from each other symmetrically, slide laterally on the core in such manner that they come near to each other along two of their adjacent respective edges, the two other edges drawing away from each other in order to let the core drive in, the result being a defective anchoring of the plug. The main cause of such a defect may be the heterogeneity of the material receiving the fastener, as for instance concrete.

The primary object of the present invention is, therefore, to obviate such a disadvantage and, to this end, there is provided an expansion core anchor of the aforementioned type, characterized in that there is provided in the slot at least a pair of internal projections which are respectively adjacent two longitudinal edges of the slot situated on either side of the axial plane perpendicular to the slot median plane and provided for guiding the expansion core during driving thereof.

In one advantageous embodiment of the anchor according to the invention, the projections are formed through displacement of the material of the deformable legs and, preferably, by a pressing operation, in a direction which is parallel to the slot median plane.

In a second embodiment of the anchor according to the invention, at least a series of four projections are provided, located at the same distance from the bearing means, and respectively arranged in the vicinity of the four edges of the slot.

The invention will be described further by way of the following description of several embodiments of the anchor according to the invention, with reference to the accompanying drawing in which:

FIG. 3 is a cross-sectional view along line III—III of FIG. 1, the expansion core being slightly driven in;

FIG. 4 is a cross-sectional view at a larger scale along line IV—IV of FIG. 1, the expansion core being driven in; and FIG. 5 is a view similar to that of FIG. 3 of another embodiment of the anchor according to the invention.

Figures 1, 2:
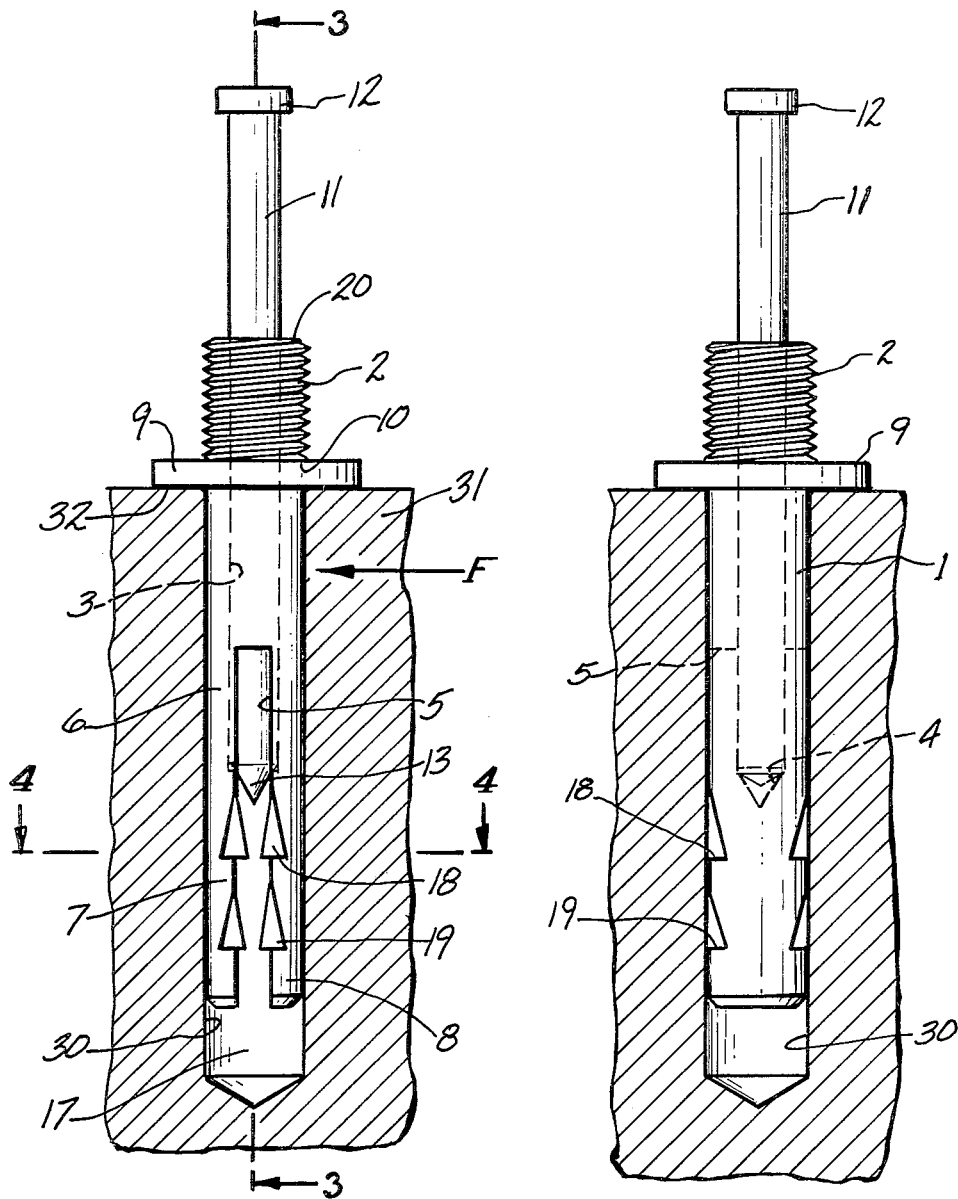
FIG. 1 is a front view of a preferred embodiment of the anchor according to the invention.
FIG. 2 is a view along arrow F of FIG. 1.
Figure 4:
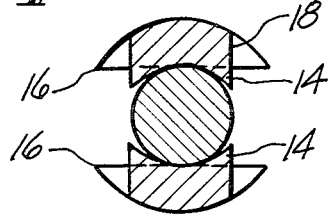

The anchor according to the invention shown in FIGS. 1 to 4 includes a right-circular cylindrical body 1, provided with an external peripheral thread at one of its ends. A circular channel 3 is bored axially in cylinder 1, from the end provided with thread 2 to a bottom 4. A diametral longitudinal slot 5, having a width less than the channel diameter, is provided at the other end 6, or crural end, of the cylindrical body 1, in order to form two legs 7 and 8. A metallic washer 9, which forms the bearing means of body 1 to bear against the edge 32 of a hole 30 previously drilled in receiving material 31, is forcibly driven onto the smooth part of cylinder 1 until it comes in abutment against end 10 of thread 2. An expansion core, made of a nail 11 provided with a head 12, the nominal diameter of the nail body 11 being substantially equal to the channel nominal diameter 3, is driven into channel 3 until its point 13 reaches the vicinity of the end 4 of the blind channel 3. Two series of four axially limited, i.e. short projections 14 and 15 are provided in the slot 5 situated four by four at the same distance from washer 9 and substantially on the circle having its center on the axis of body 1, the four projections of a same series being respectively adjacent the four edges 16 of slot 5. In the illustrated embodiment, projections 14 and 15 have been formed by pressing the crural extremity 6 in a direction parallel to the median plane 17 of slot 5 and slightly inclined in relation to the axis of body 1, the material which has been displaced to form said projections having left on the surface of end 6 notches 18 and 19 corresponding respectively to projections 14 and 15. According to the pressing-tool which is used, the projections may be formed in one, two or four steps.

Once the cylindrical body 1 has been introduced in hole 30, washer 9 being in abutment against edge 32 of said hole and end 10 of thread 2, and the nail 11 projecting outside of said body, one strikes the head 12 of nail 11 until said head comes into abutment against head 20 of thread 2.

According to the invention, nail 11 is also guided, while it is being driven in, by projections 14 and 15. The width of slot 5 being less than the nail diameter 11, the driving-in of the latter causes deformation of legs 7 and 8 towards the outside.

The advantage of projections 14 and 15 lies in the fact that, significant efforts being necessary for redisplacing the material of the projections towards notches 18 and 19, nail 11 remains better centered on the anchor axis and can only drform more symmetrically legs 7 and 8, thus providing a good expansion and avoiding damaging the quality of the anchoring. In any case, if the nail 11 is thrown off center in the cylindrical body 1, the eccentricity is very small and in no way comparable to that which would happen in the absence of the projections.

It will be noted that the formation of the projections according to the invention entails simultaneously, due to notches 18 and 19 situated at two different levels, a reduction of the rigidity of legs 7 and 8 at the height of said notches, which is favourable to the expansion and good anchoring of the anchor.

Figures 3, 5:
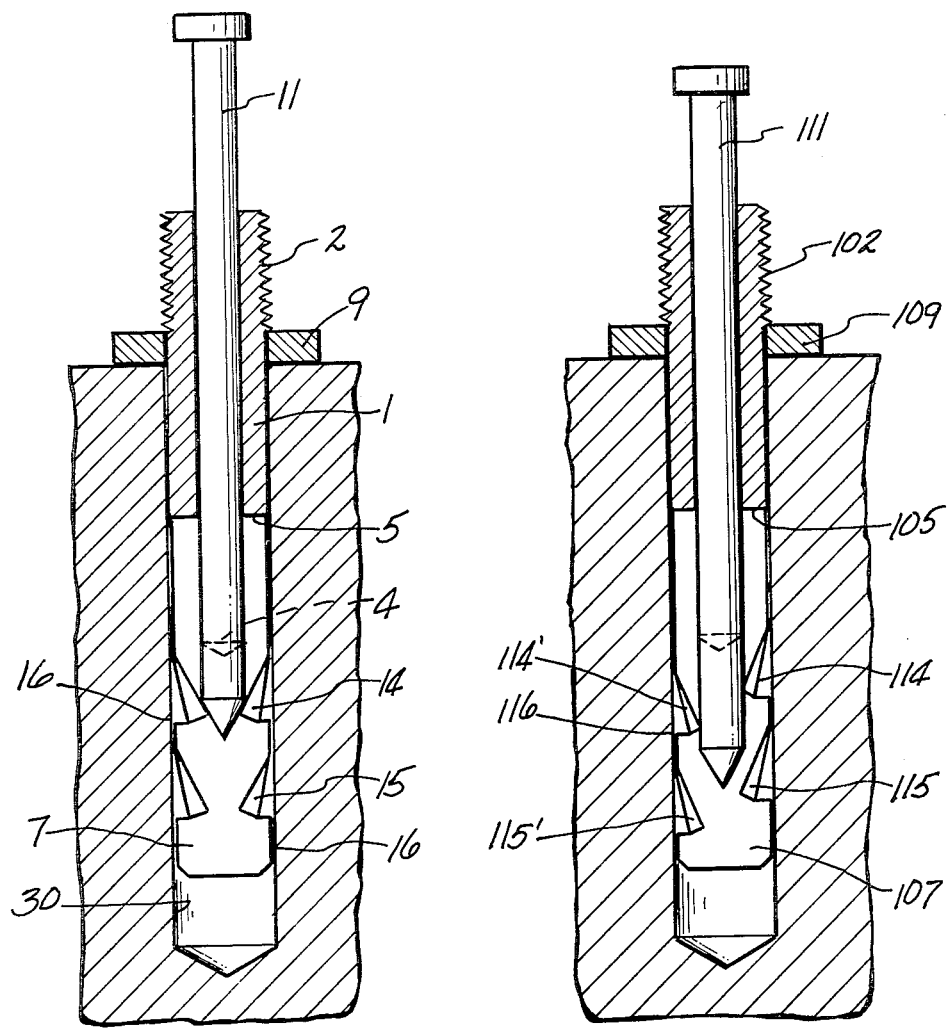

The embodiment of the anchor shown in FIG. 5 is similar to that previously described, with the difference, however, that the projections are not situated four by four at the same level in relation to washer 109, but at two different levels for projections 114–114' and 115–115', the levels of the projection pairs 114 and 115 being alternated with those of the projection pairs 114' and 115'.

The invention is not limited to the embodiments hereinabove discussed; there could be for instance only one projection or two projections at a given level, the projections being two by two respectively adjacent two slot edges situated on opposite sides of the anchor axial plane which is perpendicular to the slot median plane. On the other hand, the diametral slot shown in the drawing could be replaced by several longitudinal slots.

The anchor could also be completely deprived of an external peripheral thread, but could comprise a head the lower part of which would form the bearing means to bear on the receiving material. Accordingly, the scope of the invention is intended to be limited only by the scope of the appended claims.

What is claimed is:

1. In an expansion core anchor of the type adapted to be anchored in a predrilled hole in a receiving material, comprising a right-circular cylindrical body formed with a head and a crural end, said head being provided with an external peripheral thread and a circular bore in which is lodged in a nail-like expansion core, said crural end being divided by at least one slot into a plurality of deformable legs, said legs being adapted to be forced radially outwardly to grip the surface of the hole upon driving of said core toward said end; the improvement comprising: at least two pairs of axially limited internal projections, the ones of each pair being disposed adjacent longitudinal edges of said slot and situated one on either side of the axial plane perpendicular to the median plane of said slot, both of each pair of projections lying in a plane perpendicular to the axis of said body, one of said projections being disposed adjacent each edge of said slot, said projections each including a surface curved to conform to the shank of said expansion core, whereby said projections are adapted for guiding said expansion core during driving thereof.

2. The anchor of claim 1, wherein all four of said series of projections lie in a plane perpendicular to the axis of said body.

* * * * *